United States Patent
Jayaramachar et al.

(10) Patent No.: US 12,452,137 B1
(45) Date of Patent: Oct. 21, 2025

(54) METHODS, SYSTEMS, AND COMPUTER READABLE MEDIA FOR PROVIDING FOR NETWORK TOPOLOGY LEARNING BY SERVICE COMMUNICATION PROXY (SCP) USING ROOT NETWORK FUNCTION (NF) REPOSITORY FUNCTION (NRF)

(71) Applicant: Oracle International Corporation, Redwood Shores, CA (US)

(72) Inventors: Amarnath Jayaramachar, Bangalore (IN); Yesh Goel, Bangalore (IN); Doki Satish Kumar Patro, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 59 days.

(21) Appl. No.: 18/677,181

(22) Filed: May 29, 2024

(51) Int. Cl.
*H04L 41/12* (2022.01)
*H04L 67/56* (2022.01)

(52) U.S. Cl.
CPC ............ *H04L 41/12* (2013.01); *H04L 67/56* (2022.05)

(58) Field of Classification Search
CPC .............................. H04L 41/12; H04L 67/56
See application file for complete search history.

(56) References Cited

U.S. PATENT DOCUMENTS

| | | | |
|---|---|---|---|
| 10,833,938 B1 | 11/2020 | Rajput et al. | |
| 10,856,158 B2 | 12/2020 | Mendoza et al. | |
| 11,477,670 B2 | 10/2022 | Mendoza et al. | |
| 11,558,732 B1 | 1/2023 | Malhotra et al. | |
| 11,743,363 B1* | 8/2023 | Goel | H04L 67/51 709/201 |
| 12,101,730 B2 | 9/2024 | Jayaramachar et al. | |
| 2020/0296606 A1 | 9/2020 | Mendoza et al. | |
| 2021/0064406 A1 | 3/2021 | Engelhart | |
| 2021/0067480 A1 | 3/2021 | Goel | |
| 2021/0067485 A1 | 3/2021 | Goel | |

(Continued)

FOREIGN PATENT DOCUMENTS

| | | |
|---|---|---|
| EP | 4 243 379 B1 | 12/2024 |
| WO | WO 2023/229855 A1 | 11/2023 |

OTHER PUBLICATIONS

Decision to Grant for European Patent Application Serial No. 23157508.5 (Nov. 7, 2024).

(Continued)

*Primary Examiner* — Suraj M Joshi
(74) *Attorney, Agent, or Firm* — Jenkins, Taylor & Hunt, P.A.

(57) ABSTRACT

A method for providing for SCPs to learn network topology using a root NRF includes storing, by a root NRF, NF instance identifiers of a plurality of NFs registered with a plurality of circle NRFs. The method further includes providing, by the root NRF, a one-stop network topology access interface through which an SCP can learn network topologies of network circles served by each of the circle NRFs. The method further includes receiving, by the root NRF, from the SCP and via the one-stop network topology access interface, for obtaining network topology information from the circle NRFs. The method further includes communicating, by the root NRF, with the circle NRFs and on behalf of the SCP, to trigger the circle NRFs to provide the network topology information.

20 Claims, 11 Drawing Sheets

(56) References Cited

U.S. PATENT DOCUMENTS

| | | | |
|---|---|---|---|
| 2021/0084508 | A1 | 3/2021 | Mendoza et al. |
| 2021/0258861 | A1 | 8/2021 | Wang et al. |
| 2021/0367854 | A1 | 11/2021 | Lee |
| 2021/0385732 | A1 | 12/2021 | Reyes et al. |
| 2022/0191294 | A1 | 6/2022 | Yang |
| 2022/0295384 | A1 | 9/2022 | Gupta et al. |
| 2022/0295386 | A1 | 9/2022 | Lu et al. |
| 2022/0322270 | A1 | 10/2022 | Srivastava et al. |
| 2022/0346188 | A1 | 10/2022 | Malhotra |
| 2022/0393971 | A1 | 12/2022 | Rodrigo et al. |
| 2023/0007536 | A1 | 1/2023 | Sharma |
| 2023/0032054 | A1 | 2/2023 | Jayaramachar |
| 2023/0110286 | A1* | 4/2023 | Jayaramachar ..... H04L 61/4511 370/329 |
| 2023/0284292 | A1 | 9/2023 | Hellgren et al. |
| 2023/0292274 | A1 | 9/2023 | Jayaramachar et al. |
| 2023/0413214 | A1 | 12/2023 | Khare |
| 2024/0137290 | A1 | 4/2024 | Alvarez Dominguez et al. |

OTHER PUBLICATIONS

"3rd Generation Partnership Project; Technical Specification Group Services and System Aspects; System Architecture for the 5G System (5GS); Stage 2 (Release 18)" 3GPP TS 23.501, V18.5.0 (Mar. 2024).

"3rd Generation Partnership Project; Technical Specification Group Core Network and Terminals; 5G System; Network Function Repository Services; Stage 3 (Release 18)", 3GPP TS 29.510, V18.6.0 (Mar. 2024).

Intent to Grant for European Patent Application Serial No. 23157508.5 (Jul. 2, 2024).

Commonly-Assigned, co-pending U.S. Appl. No. 18/749,349 for "Methods, Systems, and Computer Readable Media for Communicating and Using Network Function (NF) Set Identifiers in Hierarchical NF Repository Function (NRF) Deployments" (Unpublished, filed Jun. 20, 2024).

Notice of Allowance for U.S. Appl. No. 17/689,777 (May 13, 2024).

"3rd Generation Partnership Project; Technical Specification Group Core Network and Terminals; 5G System; Network Function Repository Services; Stage 3 (Release 16)", 3GPP TS 29.510, V16.10.0 (Dec. 2021).

Extended European Search Report for European Patent Application Serial No. 23157508.5 (Jul. 19, 2023).

Notice of Publication for European Patent Application Serial No. 23157508.5 (Aug. 17, 2023).

"3rd Generation Partnership Project; Technical Specification Group Core Network and Terminals; 5G System; Network Function Repository Services; Stage 3 (Release 16)," 3GPP TS 29.510, V16.5.0, pp. 1-209 (Nov. 2020).

Notice of Allowance and Fee(s) Due for U.S. Appl. No. 147/751,584 (Jul. 14, 2023).

Applicant-Initiated Interview Summary for U.S. Appl. No. 17/751,584 (Jul. 3, 2023).

Non-Final Office Action for U.S. Appl. No. 17/751,584 (Mar. 29, 2023).

Commonly-Assigned, co-pending U.S. Appl. No. 17/751,584 for "Methods, Systems, and Computer Readable Media for Utilizing Network Function (NF) Service Attributes Associated with Registered NF Service Producers in a Hierarchical Network" (Unpublished, filed May 23, 2022).

"3rd Generation Partnership Project; Technical Specification Group Core Network and Terminals; 5G System; Network Function Repository Services; Stage 3 (Release 17)," 3GPP TS 29.510, V17.5.0, pp. 1-298 (Mar. 2022).

"3rd Generation Partnership Project; Technical Specification Group Core Network and Terminals; 5G System; Technical Realization of Service Based Architecture; Stage 3 (Release 17)," 3GPP TS 29.500, V17.6.0, pp. 1-126 (Mar. 2022).

\* cited by examiner

METHODS, SYSTEMS, AND COMPUTER READABLE MEDIA FOR PROVIDING FOR NETWORK TOPOLOGY LEARNING BY SERVICE COMMUNICATION PROXY (SCP) USING ROOT NETWORK FUNCTION (NF) REPOSITORY FUNCTION (NRF)

TECHNICAL FIELD

The subject matter described herein relates to learning network topology information. More particularly, the subject matter described herein relates to methods, systems, and computer readable media for providing for network topology learning by an SCP using a root NRF.

BACKGROUND

In 5G telecommunications networks, a network function that provides service is referred to as a producer NF or service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides one or more services. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the types of services provided by an NF instance as well as contact and capacity information regarding the NF instance.

SCPs route messages between producer NF instances. An SCP can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

One problem that can exist in 5G and subsequent generation networks is the inability to provide an efficient mechanism for SCPs to learn network topology information.

In hierarchical network deployments, an operator's network may be divided into regions, referred to herein as circles. Each circle may include an NRF, an SCP, and one or more producer NFs. The SCPs and NRFs in each circle are referred to herein as circle SCPs and circle NRFs, respectively. Each circle NRF contains network topology information of producer NFs in its respective circle. The circle NRFs register with the root NRF and provide network topology information to the root NRF. Each circle SCP needs network topology information from other circles to route messages to producer NFs in the other circles. One way for the SCP to obtain the network topology information from other circles is to query and/or subscribe to the NRFs in the other circles. Such a solution is inefficient because each circle SCP must query and subscribe to each of the circle NRFs, creating a strain on SCP and NRF resources, as well as increasing network traffic.

Accordingly, in light of these and other difficulties, there exists a need for improved methods, systems, and computer readable media for obtaining network topology information by an SCP.

SUMMARY

A method for providing for SCPs to learn network topology using a root NRF includes storing, by a root NRF, NF instance identifiers of a plurality of NFs registered with a plurality of circle NRFs. The method further includes providing, by the root NRF, a one-stop network topology access interface through which a service communication proxy (SCP) can learn network topologies of network circles served by each of the circle NRFs. The method further includes receiving, by the root NRF, from the SCP and via the one-stop network topology access interface, a message for obtaining network topology information from the circle NRFs. The method further includes communicating, by the root NRF, with the circle NRFs and on behalf of the SCP, to trigger the circle NRFs to provide the network topology information.

According to another aspect of the subject matter described herein, the method for providing for SCPs to learn network topology information using a root NRF includes, at the root NRF, receiving NF register requests from the circle NRFs including NrfInfo attributes and storing the NF instance identifiers includes storing NF instance identifiers obtained from the NrfInfo attributes.

According to another aspect of the subject matter described herein, providing the one-stop network topology access interface includes providing an NF status subscribe interface through which the SCP can subscribe to receive network topology information regarding the NFs registered with the circle NRFs.

According to another aspect of the subject matter described herein, receiving a message from the SCP includes receiving an NF status subscribe message from the SCP for subscribing to receive network topology information from the circle NRFs and communicating with the circle NRFs to trigger the circle NRFs to provide the network topology information includes transmitting an NF status subscribe message from the root NRF to each of the circle NRFs.

According to another aspect of the subject matter described herein, the method for providing for an SCP to learn network topology information using a root NRF includes structuring, by the root NRF, the NF status subscribe message transmitted to each of the circle NRFs to trigger each of the circle NRFs to send the network topology information directly to the SCP.

According to another aspect of the subject matter described herein, structuring the NF status subscribe message transmitted to each of the circle NRFs to trigger the circle NRFs to send the network topology information directly to the SCP comprises inserting a notification uniform resource indicator (URI) of the SCP in the NF status subscribe message.

According to another aspect of the subject matter described herein, providing the one-stop network topology access interface includes providing an NF list retrieval interface through which the SCP can obtain, from the root NRF, a list of NF instance IDs of NFs registered with the circle NRFs.

According to another aspect of the subject matter described herein, receiving a message from the SCP includes receiving an NF list retrieval request message from the SCP and further comprising generating and transmitting, to the SCP, an NF list retrieval response message including a list of NF instance IDs requested by the NF list retrieval request message and a resource uniform resource indicator (URI) of the root NRF.

According to another aspect of the subject matter described herein, providing the one-stop network topology access interface includes providing an NF profile retrieval interface through which the SCP can obtain, from the root NRF, NF profiles of NFs registered with the circle NRFs.

According to another aspect of the subject matter described herein, receiving a message from the SCP includes receiving an NF profile retrieval request message from the SCP and communicating with the circle NRFs includes transmitting NF profile retrieval request messages to the circle NRFs, receiving NF profile retrieval response messages from the circle NRFs and further comprising, transmitting, by the root NRF and to the SCP, an NF profile retrieval response message including network topology information obtained from the NF profile retrieval response messages received from the circle NRFs.

According to another aspect of the subject matter described herein, a system for providing for SCPs to learn network topology using a root NRF is provided. The system includes a root NRF including at least one processor and a memory. The system includes an NF profiles/network topology database embodied in the memory for storing NF instance identifiers of a plurality of NFs registered with a plurality of circle NRFs. The system further includes a network topology access manager implemented by the at least one processor for providing a one-stop network topology access interface through which an SCP can learn network topologies of network circles served by each of the circle NRFs, receiving, from the SCP and via the one-stop network topology access interface, a message for obtaining network topology information regarding network circles of the circle NRFs, and communicating, with the circle NRFs and on behalf of the SCP, to trigger the circle NRFs to provide the network topology information.

According to another aspect of the subject matter described herein, the one-stop network topology access manager is configured to provide, as part of the one-stop network topology access interface, an NF status subscribe interface through which the SCP can subscribe to receive network topology information regarding the NFs registered with the circle NRFs.

According to another aspect of the subject matter described herein, the message received from the SCP includes an NF status subscribe message from the SCP for subscribing to receive network topology information from the circle NRFs and the one-stop network topology access manager is configured to communicate with the circle NRFs to trigger the circle NRFs to provide the network topology information by transmitting an NF status subscribe message from the root NRF to each of the circle NRFs.

According to another aspect of the subject matter described herein, the one-stop network topology access manager is configured to structure the NF status subscribe message transmitted to each of the circle NRFs to trigger each of the circle NRFs to send the network topology information directly to the SCP.

According to another aspect of the subject matter described herein, in structuring the NF status subscribe message transmitted to each of the circle NRFs to trigger the circle NRFs to send the network topology information directly to the SCP, the one-stop network topology access manager is configured to insert a notification uniform resource indicator (URI) of the SCP in the NF status subscribe message.

According to another aspect of the subject matter described herein, the one-stop network topology access manager is configured to provide, as part of the one-stop network topology access interface, an NF list retrieval interface through which the SCP can obtain, from the root NRF, a list of NF instance IDs of NFs registered with the circle NRFs.

According to another aspect of the subject matter described herein, the message from the SCP includes an NF list retrieval request message from the SCP and the one-stop network topology access manager is configured to generate and transmit, to the SCP, an NF list retrieval response message including a list of NF instance IDs requested by the NF list retrieval request message and a resource uniform resource indicator (URI) of the root NRF.

According to another aspect of the subject matter described herein, the one-stop network topology access manager is configured to provide, as part of the one-stop network topology access interface, an NF profile retrieval interface through which the SCP can obtain, from the root NRF, NF profiles of NFs registered with the circle NRFs.

According to another aspect of the subject matter described herein, the message from the SCP includes an NF profile retrieval request message from the SCP and the one-stop network topology access manager is configured to communicate with the circle NRFs by transmitting NF profile retrieval request messages to the circle NRFs, receiving NF profile retrieval response messages from the circle NRFs, and transmitting, to the SCP, an NF profile retrieval response message including network topology information obtained from the NF profile retrieval response messages received from the circle NRFs.

According to another aspect of the subject matter described herein, a non-transitory computer readable medium having stored thereon executable instructions that when executed by a processor of a computer control the computer to perform steps is provided. The steps include storing, by a root network function (NF) repository function (NRF), NF instance identifiers of a plurality of NFs registered with a plurality of circle NRFs. The steps further include providing, by the root NRF, a one-stop network topology access interface through which a service communication proxy (SCP) can learn network topologies of network circles served by each of the circle NRFs. The steps further include receiving, by the root NRF, from the SCP and via the one-stop network topology access interface, a message for obtaining network topology information regarding network circles of the circle NRFs. The steps further include communicating, by the root NRF, with the circle NRFs and on behalf of the SCP, to trigger the circle NRFs to provide the network topology information.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
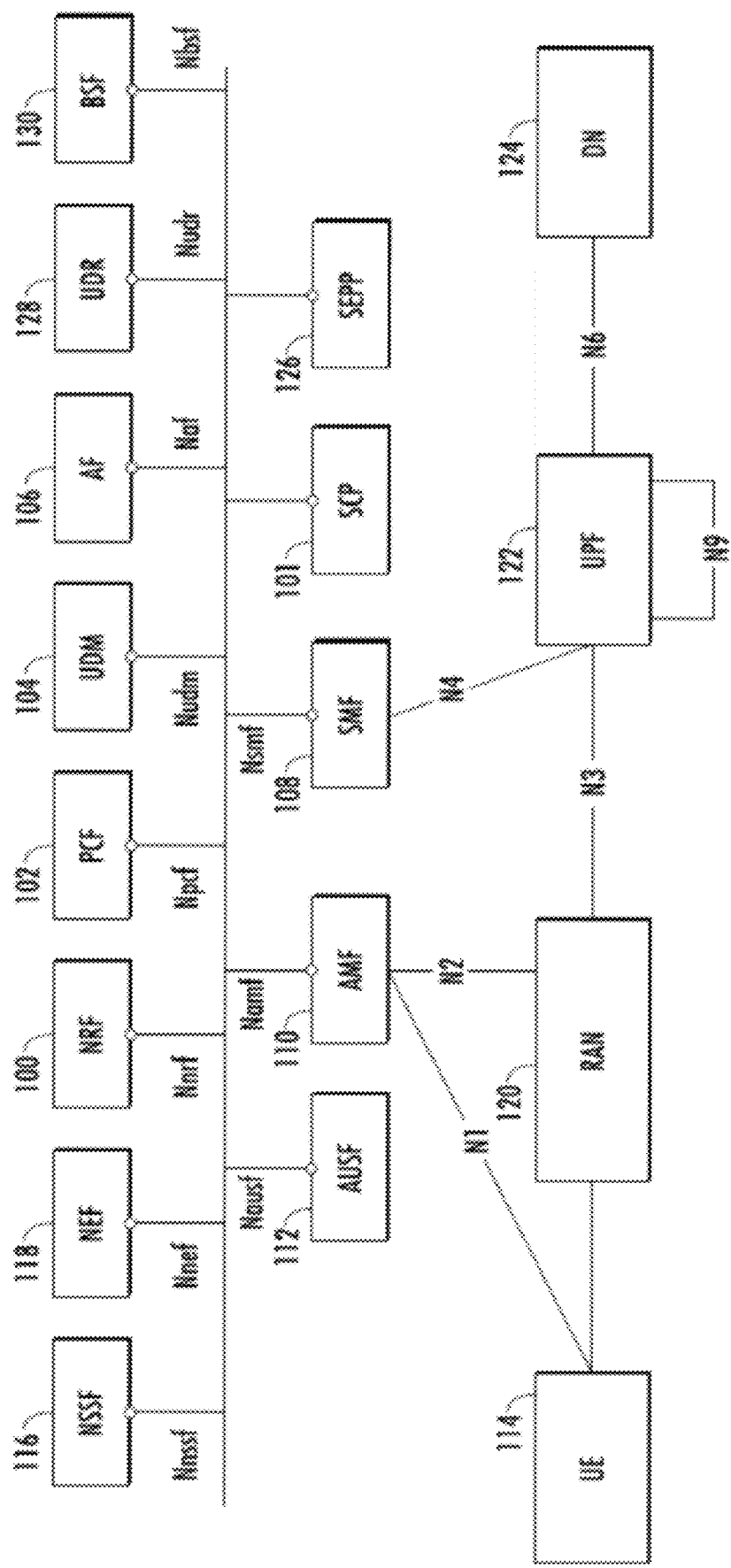
FIG. 1 is a network diagram illustrating an exemplary 5G system network architecture.

FIG. 1 is a network diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the types of services provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 provides authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

A SEPP 126 filters incoming traffic from another PLMN and can perform topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A SEPP filtering egress messages from consumer NFs in a PLMN is referred to as a consumer SEPP or C-SEPP. A SEPP that filters ingress messages directed to consumer NFs in a PLMN is referred to as a producer SEPP or P-SEPP. A given SEPP can function as a C-SEPP and a P-SEPP, depending on the role the SEPP is performing.

A unified data repository (UDR) 128 stores subscription data for UEs. A binding support function (BSF) 130 manages bindings between PDU sessions and PCFs.

As stated above, one problem that can occur in 5G and subsequent generation networks is the inability to provide an efficient mechanism for SCPs to learn network topology information. In a hierarchical network deployment model, an operator's network is divided into multiple circles. Each circle serves a unique public land mobile network (PLMN) ID. Each circle may include multiple producer NFs, multiple consumer NFs, and a circle NRF. Each circle NRF registers its NrfInfo attribute with a root NRF. The NrfInfo attribute stores a list of info attributes from all the NF producers and consumers in the circle of the registering NRF. Each circle includes an SCP that needs to learn network topology information for all of the network circles for message routing. Examples of network topology information that the SCP needs to learn include routing details of the NFs in each circle, such as Internet protocol (IP) endpoints, fully qualified domain names (FQDNs), PLMN details, and NF set information. One way for the SCP to learn this information is to subscribe with and trigger list/profile retrieval from each circle NRF to learn about all producer NFs registered with each circle NRF. The SCP creates a cache with the routing/network topology information learned from the circle NRFs and uses the cache to route messages to producer NFs.

In large network operator deployments, there could be more than 20 circles. Each circle has a unique PLMN ID, an NRF and an SCP. Each SCP may learn network topology from the NF registrations/profiles from all the NRFs in the network. In large deployments (more than 20 circles), each SCP is required to learn topology from more than 20 NRFs. Learning topology includes SCP interaction with each circle NRF, such as subscription and list/profile retrieval. With a larger number of NRFs in the network, each SCP is required to sync-up the topology with all the NRFs in the network. Synchronizing the SCP's network topology information with that of all of the circle NRFs in the network is a significant burden on network resources. The synchronization can have latency, especially when the circle SCP and the NRFs contacted for network topology information are geographically separated from each other. The synchronization can consume CPU cycles in the SCP and NRF and can also require complex connectivity management between the SCP and the circle NRFs.

As part of the solution described herein, the SCP learns network topology information by contacting the root NRF only. Each circle NRF registers with the root NRF. Each NF register request message carries an NrfInfo attribute including the nfinfo attributes of all NF profiles registered with that circle NRF. Because of the registrations, the root NRF is aware of all the circle NRFs in the network. The root NRF provides a one-stop network topology access interface for the SCP to obtain all of the needed network topology information. In response to receiving a subscription request from an SCP, the root NRF creates multiple subscriptions with the circle NRFs by transmitting subscription request messages to the circle NRFs. In the subscription request messages, the root NRF includes the notification URI of the SCP instead of the URI of the root NRF. Notify messages created by each circle NRF are transmitted directly to the SCP, rather than to the root NRF.

The root NRF creates a mapping between each circle NRF resource URI and the NF types and NF instance IDs of producer NFs registered with each circle NRF. The SCP sends a list retrieval request to the root NRF for a given NF type. The root NRF prepares a list retrieval response with the API URI pointing to the root NRF appended with the NF instance ID(s) of the producer NF(s) that correspond to the NF type in the NF list retrieval response. The SCP sends an NF profile retrieval request to the root NRF, and the root NRF sends a profile retrieval request to the circle NRF where the NF producer is registered.

The root NRF provides a one-stop solution for the SCP to learn the network topology. With this support from the root NRF, the SCP is not required to communicate with all the circle/regional NRFs to retrieve NF registration details. This significantly reduces the burden on network resources, reduces latency in network transactions, reduces CPU cycles consumed by the SCP and the circle NRFs, and reduces the need for complex connectivity management between the SCP and the circle NRFs.

Figure 2:
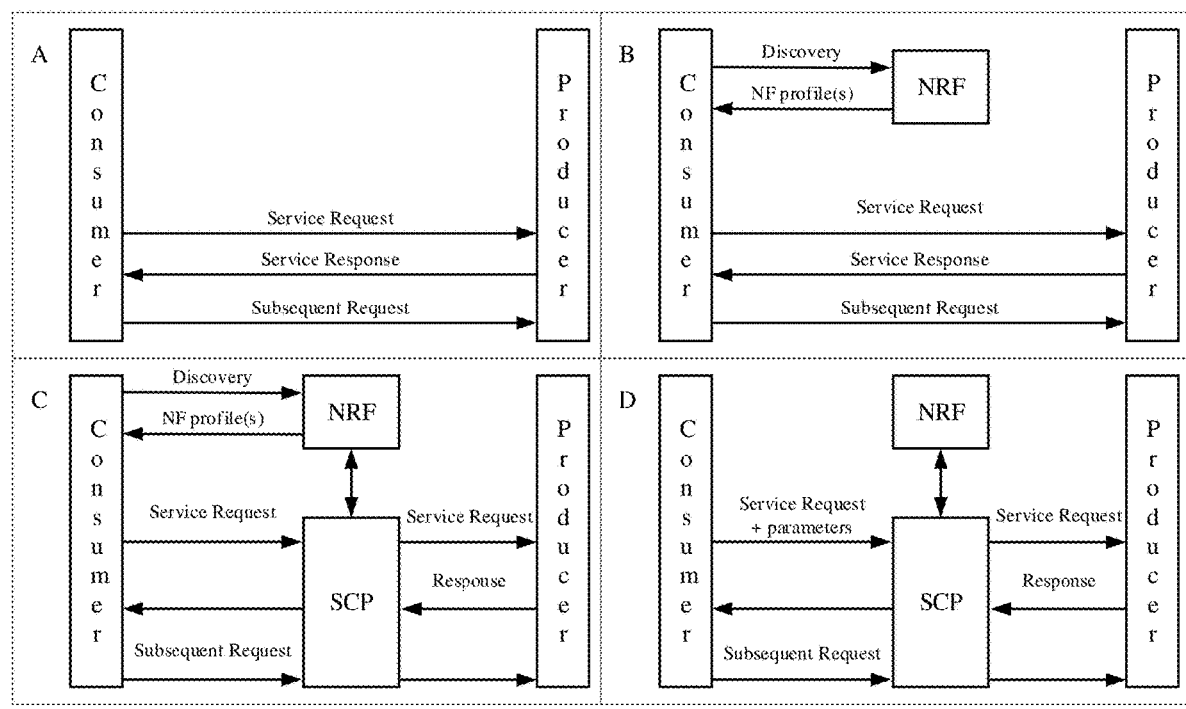
FIG. 2 is a block diagram illustrating Third Generation Partnership Project (3GPP) communication models.

FIG. 2 is a block diagram illustrating 3GPP communication models. The models illustrated in FIG. 2 include model A, where consumer NFs communicate directly with producer NFs and without NF discovery, model B where consumer NFs perform discovery with an NRF and communicate directly with producer NFs, model C, where consumer NFs perform discovery with an NRF and communicate indirectly with producer NFs via an SCP, and model D, where the SCP performs delegated discovery with the NRF and consumer NFs perform indirect communications with producer NFs using the SCP. Of particular interest to the subject matter described herein is 3GPP communication model C. 3GPP TS 23.501 defines model C as follows:

Model C—Indirect communication without delegated discovery: Consumers do discovery by querying the NRF. Based on discovery result, the consumer does the selection of an NF Set or a specific NF instance of NF instance set. The consumer sends the request to the SCP containing the address of the selected service producer pointing to a NF service instance or a set of NF service instances. In the latter case, the SCP selects an NF Service instance. If possible, the SCP interacts with NRF to get selection parameters such as location, capacity, etc. The SCP routes the request to the selected NF service producer instance.

As indicated in the passage above, in communication model C, the SCP routes request messages to producer NFs. To route the messages, the SCP needs network topology information regarding the producer NFs to which messages will be routed. When the producer NFs are in a different network or PLMN from the SCP, obtaining the network topology information can be challenging.

Figure 3:
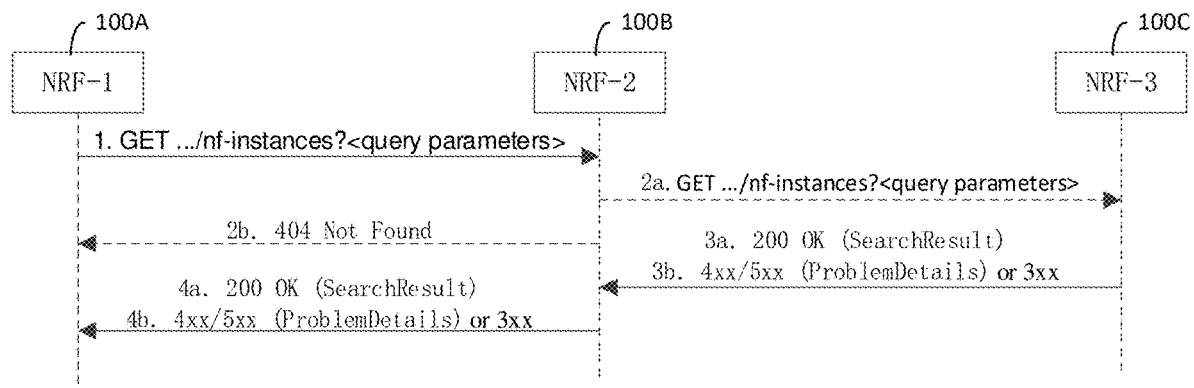
FIG. 3 is a message flow diagram illustrating service discovery with an intermediate forwarding NRF.

One procedure for obtaining network topology information from another network is service discovery with an intermediate forwarding NRF. FIG. 3 is a message flow diagram illustrating service discovery with an intermediate forwarding NRF. As per 3GPP TS 29.510, when multiple NRFs are deployed in one PLMN, one NRF may query the "nf-instances" resource in a different NRF to fulfil the service discovery request from an NF service consumer. The query between these two NRFs is forwarded by a third NRF. In FIG. 3, NRF 100B is the intermediate forwarding NRF, because NRF 100B forwards an NF discovery request from NRF 100A to NRF 100C. In hierarchical deployments, the root NRF can function as an intermediate forwarding NRF for transactions between circle NRFs. However, direct communication between a circle SCP and the root NRF provides a more efficient mechanism for the SCP to learn network topology information from circle NRFs in other networks.

Figure 4:
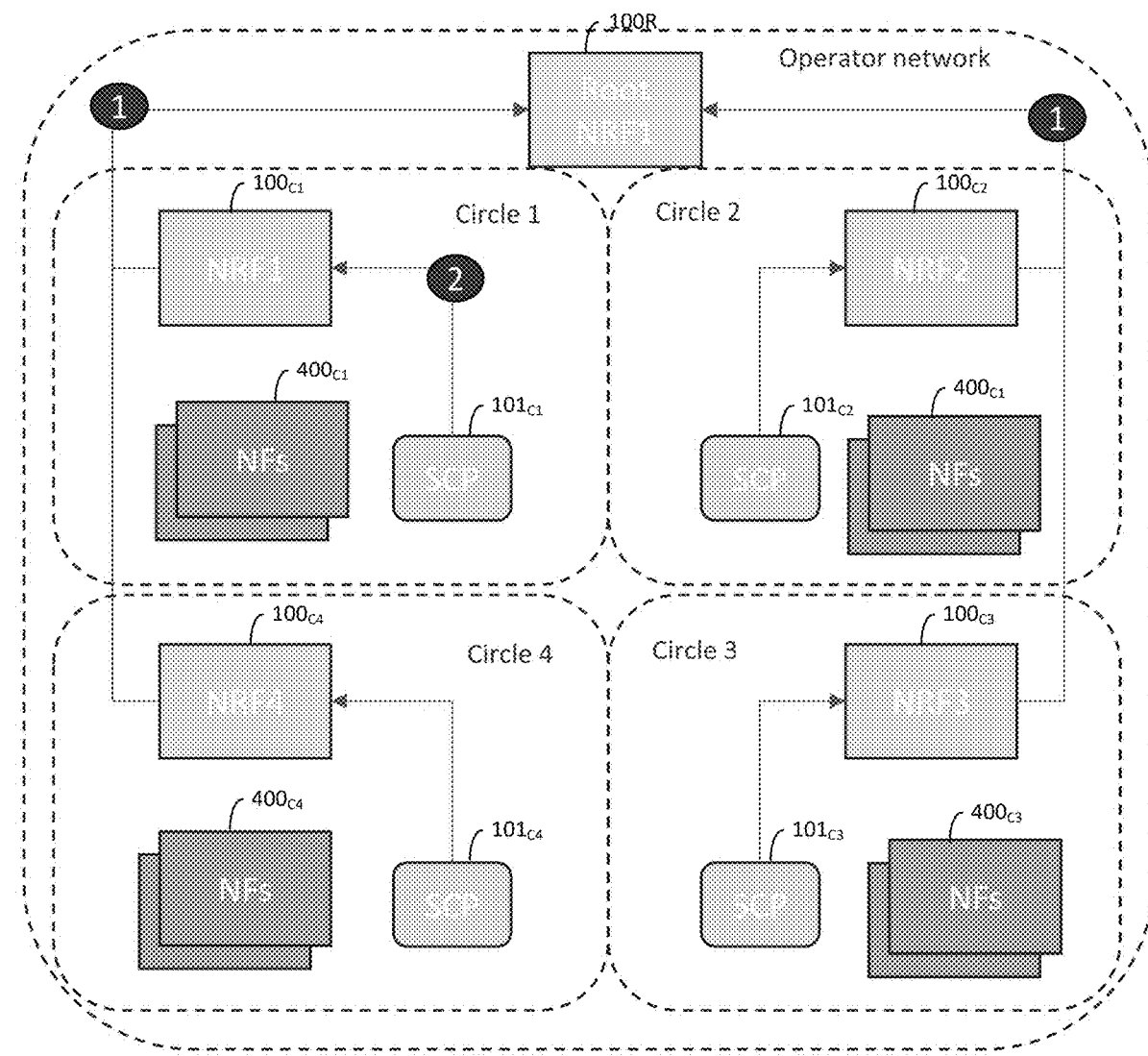
FIG. 4 is a network diagram illustrating a hierarchical network deployment.

FIG. 4 is a network diagram illustrating a hierarchical network deployment. In FIG. 4, the network is divided into circles. Each circle includes its own PLMN ID, one of the circle NRFs $100_{C1}$-$100_{C4}$, one of the circle SCPs $101_{C1}$-$101_{C4}$, and one of the groups of consumer and producer NFs $400_{C1}$-$400_{C4}$. Each circle NRF $100_{C1}$-$100_{C4}$ registers its NrfInfo attribute with a root NRF 100R. The NrfInfo attribute holds a list of info attributes from all the NF producers and consumers in each circle. Each circle SCP $101_{C1}$-$101_{C4}$ learns network topology from all of the circle NRFs $100_{C1}$-$100_{C4}$ to provide routing functionality. The network topology information learned includes routing details, such as IP endpoints, FQDN, PLMN details, and NF set information from the NFs in the network to provide efficient routing functionality. To learn the network topology information, the SCP subscribes with and performs list and profile retrieval information from each circle NRF $100_{C1}$-$100_{C4}$, which is inefficient.

Figure 5:
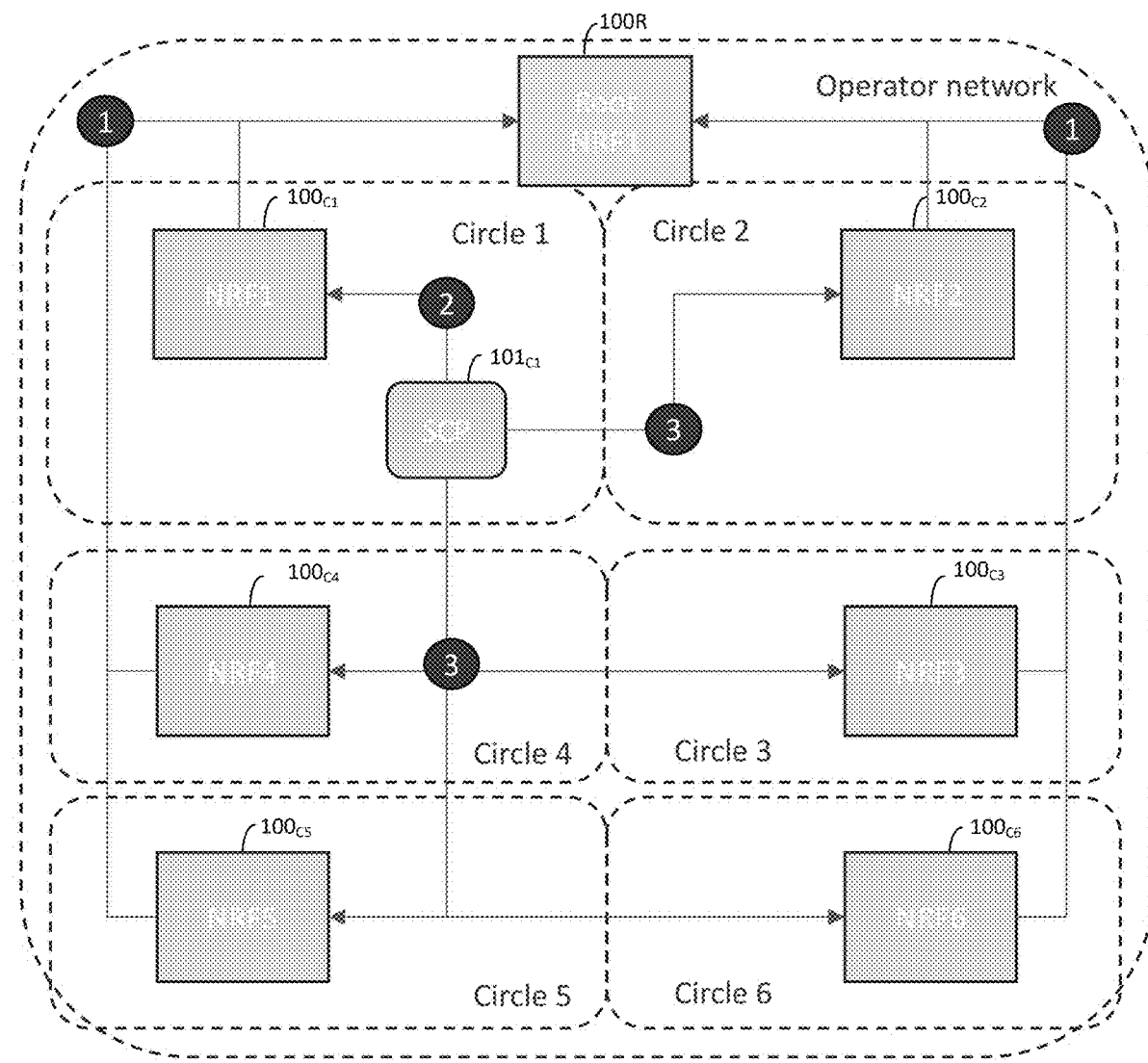
FIG. 5 is a network diagram illustrating the hierarchical network deployment of FIG. 4 where a circle SCP obtains network topology information from each of a plurality of circle NRFs.

FIG. 5 is a network diagram illustrating the hierarchical network deployment of FIG. 4 where a circle SCP obtains network topology information from each of a plurality of circle NRFs. In FIG. 5, each circle NRF $100_{C1}$-$100_{C6}$ registers its NrfInfo attribute with root NRF 100R. To perform topology discovery, circle SCP $101_{C1}$ subscribes with and performs NF list and profile retrieval operations with each circle NRF $100_{C1}$-$100_{C6}$, which results in increased messaging, increased utilization of SCP and NRF processor cycles, and increased network communication latency.

To avoid the difficulties described above, the root NRF provides a one-stop network topology access interface for SCPs to learn network topology information from circle NRFs. Through the one-stop network topology access interface, the root NRF can receive subscription requests, NF list retrieval requests, and NF profile retrieval requests from circle SCPs. For the subscription requests, the root NRF sends corresponding subscription request messages to the circle NRFs and structures the subscription request messages so that the circle NRFs will send subscription notifications directly to the circle SCPs. For the NF list retrieval requests, the root NRF responds with a list of NF instance IDs of the producer NFs that match the query parameters in the list retrieval request, along with an appended NF instance ID of the root NRF. For an NF profile retrieval request, the root NRF generates and sends corresponding NF profile retrieval request(s) to the circle NRF(s). The root NRF receives NF profile retrieval responses from the circle NRF(s) and generates and sends an NF profile retrieval response to the SCP including the network topology information received in the NF profile retrieval responses from the circle NRFs.

Figure 6A:
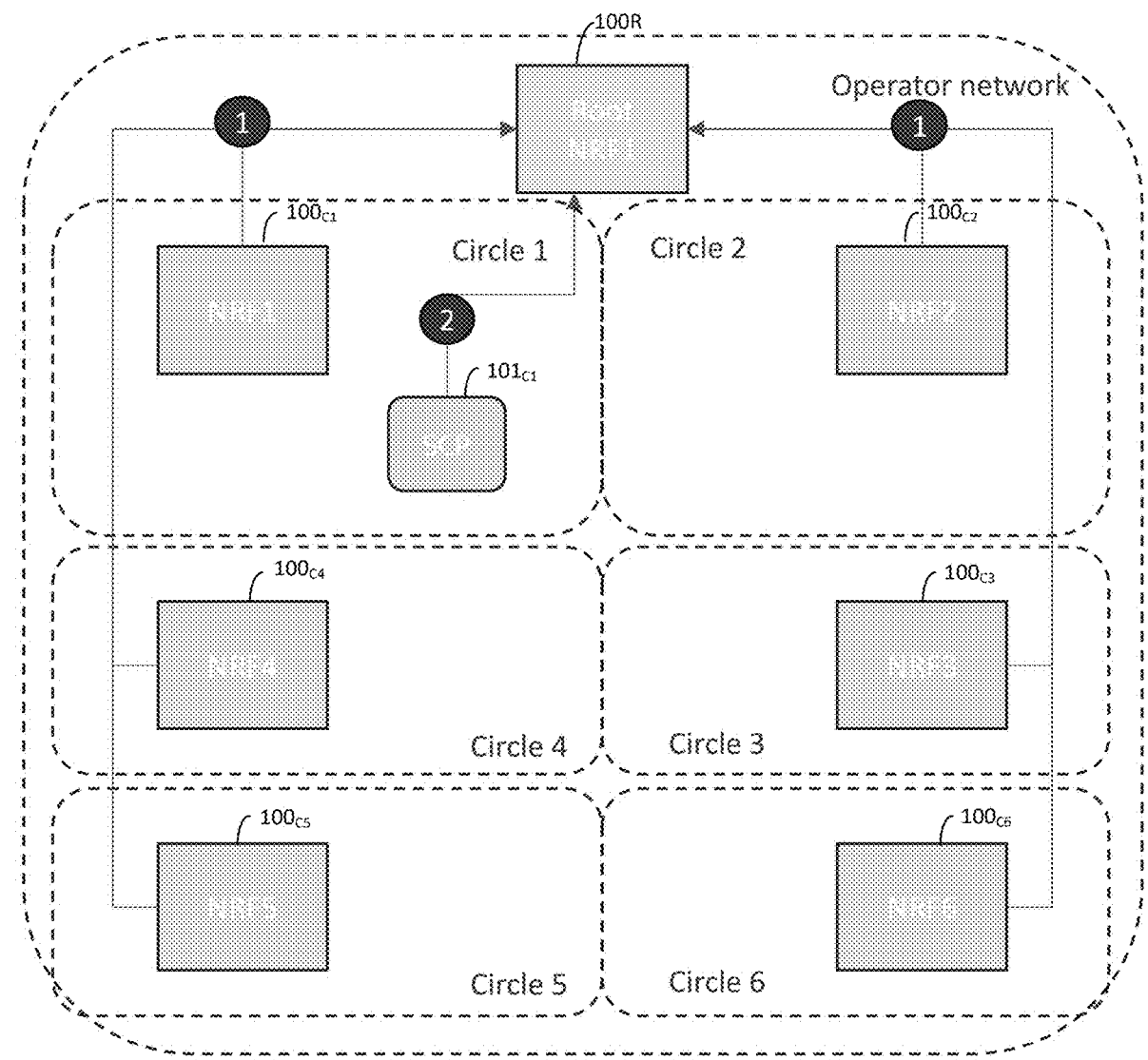
FIG. 6A is a network diagram illustrating circle NRFs registering with a root NRF and a circle SCP communicating with the root NRF to obtain network topology information.

FIG. 6A is a network diagram illustrating circle NRFs registering with a root NRF and a circle SCP communicating with the root NRF to obtain network topology information. In FIG. 6A, step 1 indicates circle NRFs $100_{C1}$-$100_{C6}$ registering their NrfInfo attributes with root NRF 100R. Step 2 indicates circle SCP $101_{C1}$ communicating with root NRF 100R to obtain network topology information regarding producer NFs registered with circle NRFs $100_{C1}$-$100_{C6}$. As indicated above, the communications with root NRF 100R may include subscription requests, list retrieval requests, and profile retrieval requests. The root NRF provides a one-stop interface for these requests from circle SCPs, such as circle SCP $101_{C1}$, and either triggers circle NRFs $100_{C1}$-$100_{C6}$ to provide the network topology information directly to circle SCP $101_{C1}$ or, in the case of profile retrieval requests, obtains the requested NF profiles from circle NRFs $100_{C1}$-$100_{C6}$ and provides the retrieved NF profiles to circle SCP $101_{C1}$.

Figure 6B:
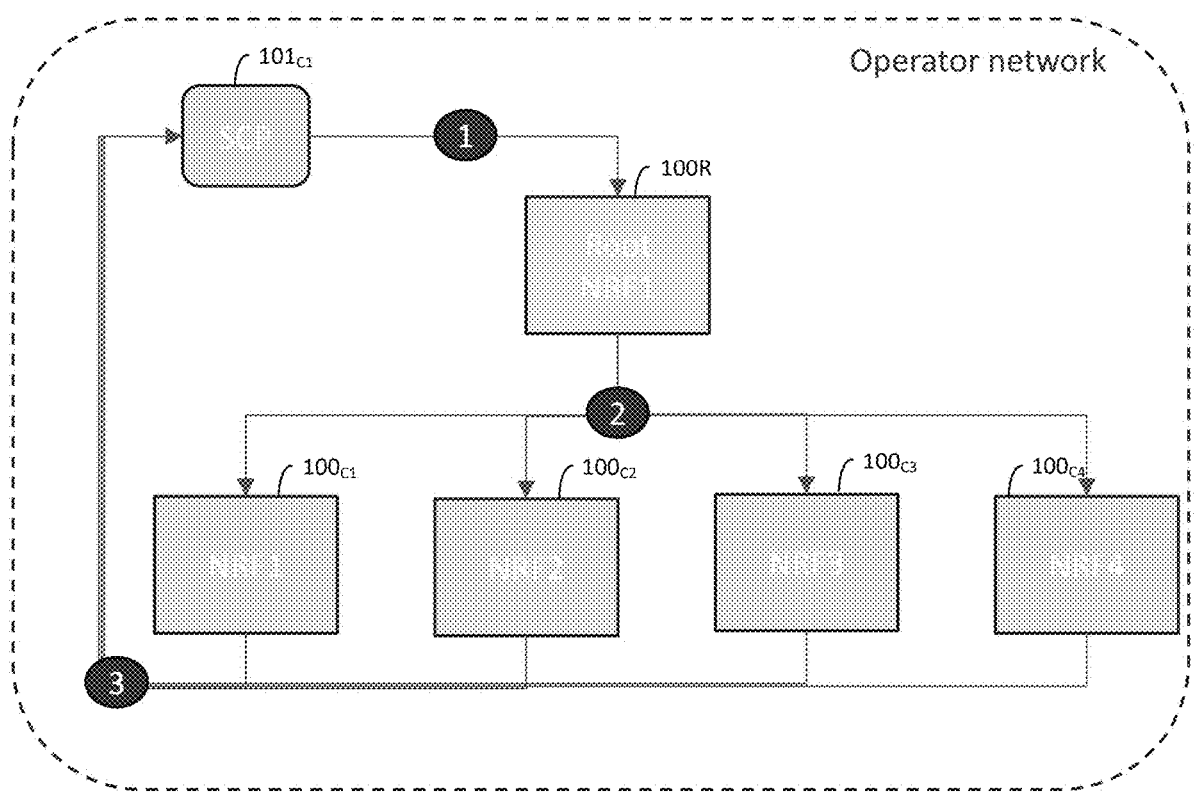
FIG. 6B is a network diagram illustrating subscription handling by the root NRF where the root NRF triggers circle NRFs to notify the circle SCP of changes in network topology information.

FIG. 6B is a network diagram illustrating subscription handling by the root NRF where the root NRF triggers circle NRFs to notify the circle SCP of changes in network topology information. Referring to FIG. 6B, in step 1, circle SCP $101_{C1}$ sends an NF status subscribe message to root NRF 100R. The NF status subscribe message subscribes for all NF types or a subset of NF types registered with circle NRFs $100_{C1}$-$100_{C4}$. Root NRF 100R receives the NF status subscribe message, identifies the message as being from an SCP, identifies circle NRFs that map to the NF type identified in the subscription details in the NF status subscribe message, and, in step 2, sends NF status subscribe messages to each of circle NRFs $100_{C1}$-$100_{C4}$. In the NF status subscribe messages, rather than including the notification URI of root NRF 100R, root NRF 100R inserts, as the notification URI in each of the NF status subscribe messages, the notification URI of circle SCP $101_{C1}$. In step 3, when NF profile updates occur, rather than sending notify request messages with the updated NF profiles to root NRF 100R, circle NRFs $100_{C1}$-$100_{C4}$ send the notify request messages directly to circle SCP $101_{C1}$.

As part of providing a one-stop network topology access interface for the circle SCPs, the root NRF is configured to receive NF list retrieval and NF profile retrieval requests from the circle SCPs and facilitate the obtaining of NF profiles from the circle NRFs. The root NRF receives NF registrations from the circle NRFs. The NF registrations each include an NrfInfo attribute that contains information about NF types and NF instances registered with each of the circle NRFs. For example, for a given circle NRF, the NrfInfo attribute may include information, such as udrInfo, udmInfo, ausfInfo, amfInfo, smfInfo, upfInfo, pcfInfo, bsfInfo, nefInfo, chfInfo, pcscfInfo, lmfInfo, gmlcInfo, aanfInfo, nfInfo, and nsacfInfo. The NrfInfo attribute may be configured in the NF profile of the circle NRF, or the circle NRF may populate the NrfInfo attribute with information received during registration of other NFs, which means that the registering circle NRF is able to provide service for discovery of NFs whose information is contained in the NrfInfo attribute. The root NRF may maintain a mapping between the NF instance ID of each circle NRF and the NF types, NF instance IDs, and other information regarding the NFs registered or configured with each circle NRF. Table 1 shown below illustrates an example of information that may be maintained at each circle NRF.

TABLE 1

Circle NRF Information Stored by Root NRF

| Circle NRF Resource URI | NFType | NF Instance IDs |
| --- | --- | --- |
| NRF1234.Circle1.telco.com | AMF, UDR, UDM, AUSF, PCF | AMFC11, AMFC12, UDRC11, UDRC12, UDMC11, UDMC12, AUSFC11, AUSFC12, PCFC11, PCFC12 |
| NRF5678.Circle2.telco.com | AMF, UDR, UDM, AUSF, PCF | AMFC21, AMFC22, UDRC21, UDRC22, UDMC21, UDMC22, AUSFC21, |

TABLE 1-continued

Circle NRF Information Stored by Root NRF

| Circle NRF Resource URI | NFType | NF Instance IDs |
|---|---|---|
| | | AUSFC22, PCFC21, PCFC22 |

From Table 1, the root NRF stores registered NF information for each of the circle NRFs. The root NRF uses this information to provide NF instance IDs in response to list retrieval requests from circle SCPs. The root NRF also uses this information to determine to which NRFs an NF profile retrieval request should be directed.

The circle SCP sends an NF list retrieval request to the root NRF for a given NF type. The root NRF prepares the NF list retrieval response with the API URI pointing to the root NRF appended with the NF instance ID of the producer NFs returned in the response so that NF profile retrievals will be sent to the root NRF. The format of the NF profiles returned in the NF list retrieval response may be as follows:

. . . <root-nrf>/nfinstances/<nfinstanceID1>
    . . . <root-nrf>/nfinstances/<nfinstanceID2>
    . . .
    . . . .
    . . . <root-nrf>/nfinstances/<nfinstanceIDn>

Normally, according to 3GPP TS 29.510, a response to a list retrieval request should be structured as follows:

On success, "200 OK" shall be returned. The response body shall contain the URI (conforming to the resource URI structure as described in clause 5.2.2.9.1) of each registered NF in the NRF that satisfy the retrieval filter criteria (e.g., all NF instances of the same NF type), or an empty list if there are no NFs to return in the query result (e.g., because there are no registered NFs in the NRF, or because there are no matching NFs of the type specified in the "nf-type" query parameter, currently registered in the NRF). The total count of items satisfying the filter criteria (e.g. "nf-type") should be returned in the response (3GPP TS 29.510, V18.4.0, clause 5.2.2.8.1).

In the above-quoted passage, 3GPP TS 29.510 indicates that the list retrieval response includes the URIs of NFs registered with the responding NRF and that satisfy any retrieval criteria in the request. According to the subject matter described herein, the list retrieval response includes the NF instance IDs of the producer NFs registered with the circle NRFs and the URI of the root NRF is appended to each of the NF instance IDs.

Based on the list retrieval response, the circle SCP can trigger an NF profile retrieval request to the root NRF. The circle SCP will include, in the NF profile retrieval request, the NF instance IDs of the producer NFs of which the SCP wishes to obtain a copy of the NF profile. Upon receiving an NF profile retrieval request, the root NRF holds the transaction and triggers a new NF profile retrieval request or requests towards the circle NRF(s), which has/have the registration of the NF instance ID(s) specified in the NF profile retrieval request. The circle NRF or NRFs respond to the root NRF. When the root NRF receives the response or responses from the circle NRFs, the root NRF unholds or resumes the transaction and sends, to the circle SCP, an NF profile retrieval response including the NF profiles retrieved from the circle NRFs.

Figure 6C:
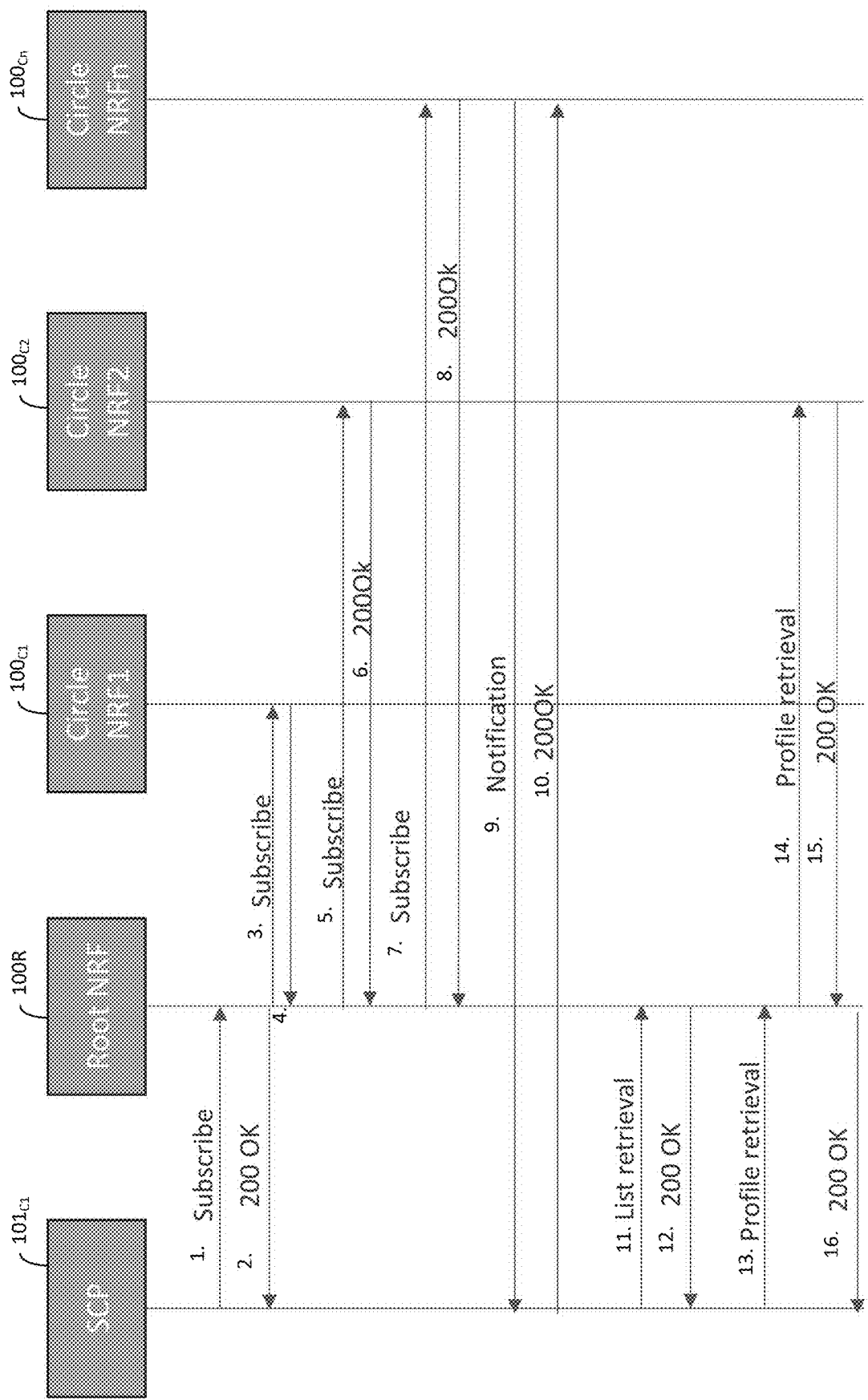
FIG. 6C is a message flow diagram illustrating a root NRF providing a one-stop network topology access interface for circle SCPs using NF subscription, list retrieval, and profile retrieval.

FIG. 6C is a message flow diagram illustrating a root NRF providing a one-stop network topology access interface for circle SCPs using NF subscription, list retrieval, and profile retrieval. Referring to FIG. 6C, in step 1, circle SCP $101_{C1}$ sends an NF status subscribe message to root NRF 100R. In step 2, root NRF 100R responds with a 200 OK message confirming successful creation of the subscription. In steps 3, 5, and 7, root NRF 100R subscribes with circle NRF $100_{C1}$, $100_{C2}$, and $100_{Cn}$. In the NF status subscribe messages, NRF 100R includes the notification URI of SCP $100_{C1}$. In steps 4, 6, and 8, circle NRFs $100_{C1}$, $100_{C2}$, and $100_{Cn}$ confirm successful creation of the subscriptions. In step 9, circle NRF $100_{Cn}$ sends a notification message directly to circle SCP $101_{C1}$. In step 10, circle SCP $101_{C1}$ responds with a 200 OK message.

In step 11, circle SCP $101_{C1}$ sends a list retrieval request to root NRF 100R. In step 12, root NRF 100R responds with a 200 OK message including a list of NF profiles that match the list retrieval parameters and appending the resource URI of root NRF 100R to each of the NF instance IDs in the list. In step 13, circle SCP $101_{C1}$ sends an NF profile retrieval request to root NRF 100R. Root NRF 100R, using its stored mappings, determines that the requested NF profile is maintained by circle NRF $100_{C2}$. Accordingly, in step 14, root NRF 100R sends an NF profile retrieval request to circle NRF $100_{C2}$. In step 15, circle NRF $100_{C2}$ responds with a 200 OK message including the requested NF profile(s). In step 16, root NRF 100R sends a 200 OK message including the requested NF profile(s) to circle SCP $101_{C2}$.

Figure 7:
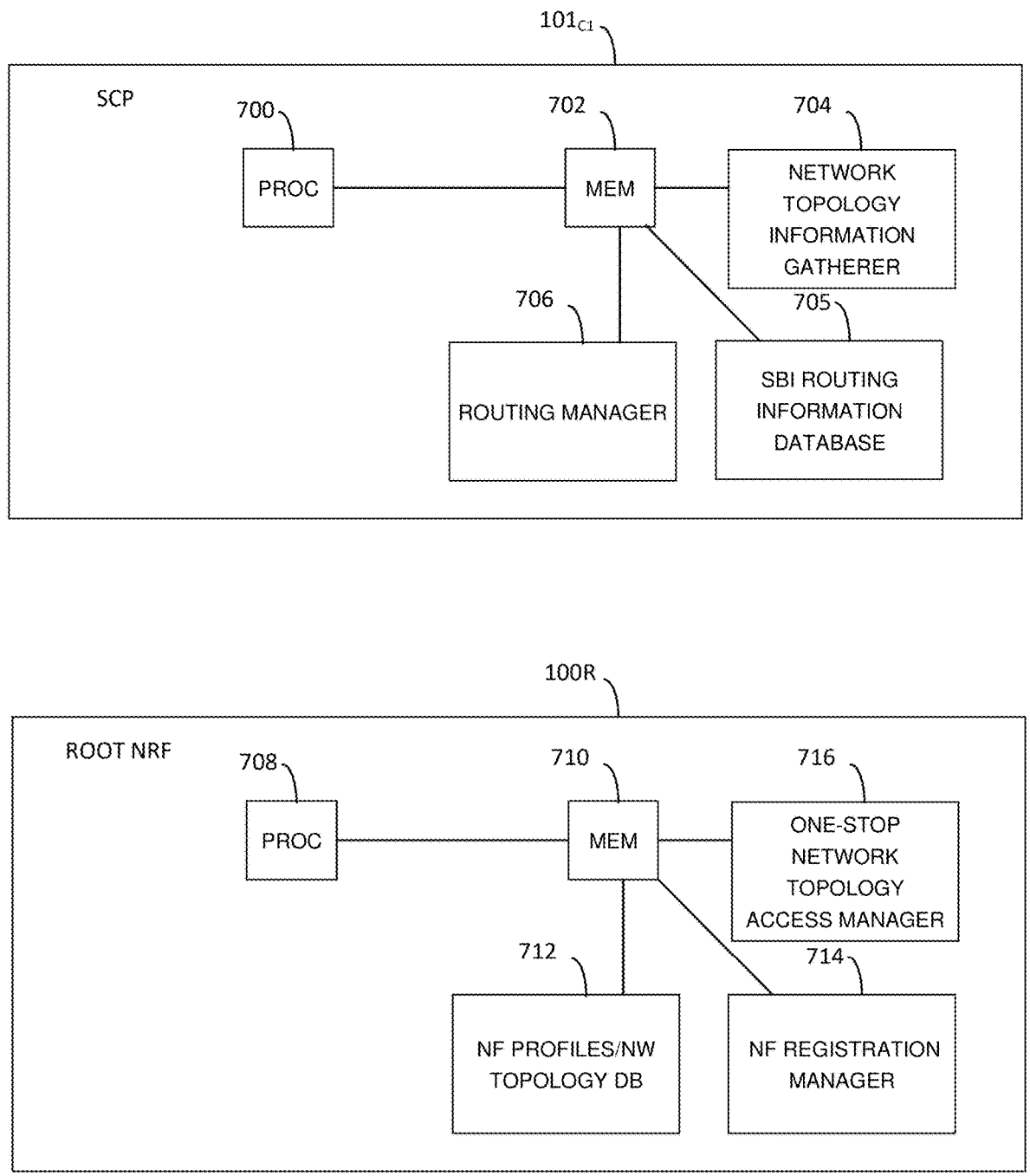
FIG. 7 is a block diagram illustrating exemplary architectures for a root NRF and a circle SCP for allowing the circle SCP to obtain network topology information using a one-stop network topology access interface provided by the root NRF.

FIG. 7 is a block diagram illustrating exemplary architectures for a root NRF and a circle SCP for allowing the circle SCP to obtain network topology information using a one-stop network topology access interface provided by the root NRF. Referring to FIG. 7, circle SCP $101_{C1}$ includes at least one processor 700 and memory 702. Circle SCP $101_{C1}$ also includes a network topology information gatherer 704 that communicates exclusively with root NRF 100R to obtain network topology information from circle NRFs and store the network topology information in an SBI routing information database 705. Circle SCP $101_{C1}$ further includes a routing manager 706 for routing SBI messages received from NFs using routing information stored in SBI routing information database 705. Network topology information gatherer 704 and routing manager 706 may be implemented using computer-executable instructions stored in memory 702 and executed by processor 700.

Root NRF 100R includes at least one processor 708 and memory 710. Root NRF 100R also includes an NF profiles/network topology database 712 for storing NF profiles of producer NFs registered with root NRF 100R and for storing network topology information read from NrfInfo attributes obtained from circle NRFs. Root NRF 100R includes an NF registration manager 714 that receives registration requests from NFs and stores the corresponding registration information in NF profiles/network topology database 712. Root NRF 100R further includes a one-stop network topology access manager 716 that provides the one-stop network topology access interface for circle SCPs to obtain network topology information for producer NFs registered with circle NRFs. One-stop network topology access manager 716 communicates with SCP $101_{C1}$ to receive and process subscription requests, NF list retrieval requests, and NF profile retrieval requests. One-stop network topology access manager 716 also communicates with circle NRFs to trigger the circle NRFs. to provide the requested network topology information either directly to SCP $101_{C1}$ or via root NRF 100R. Registration manager 714 and one-stop network topology access manager 716 may be implemented using computer-executable instructions stored in memory 710 and executed by processor 708.

Figure 8:
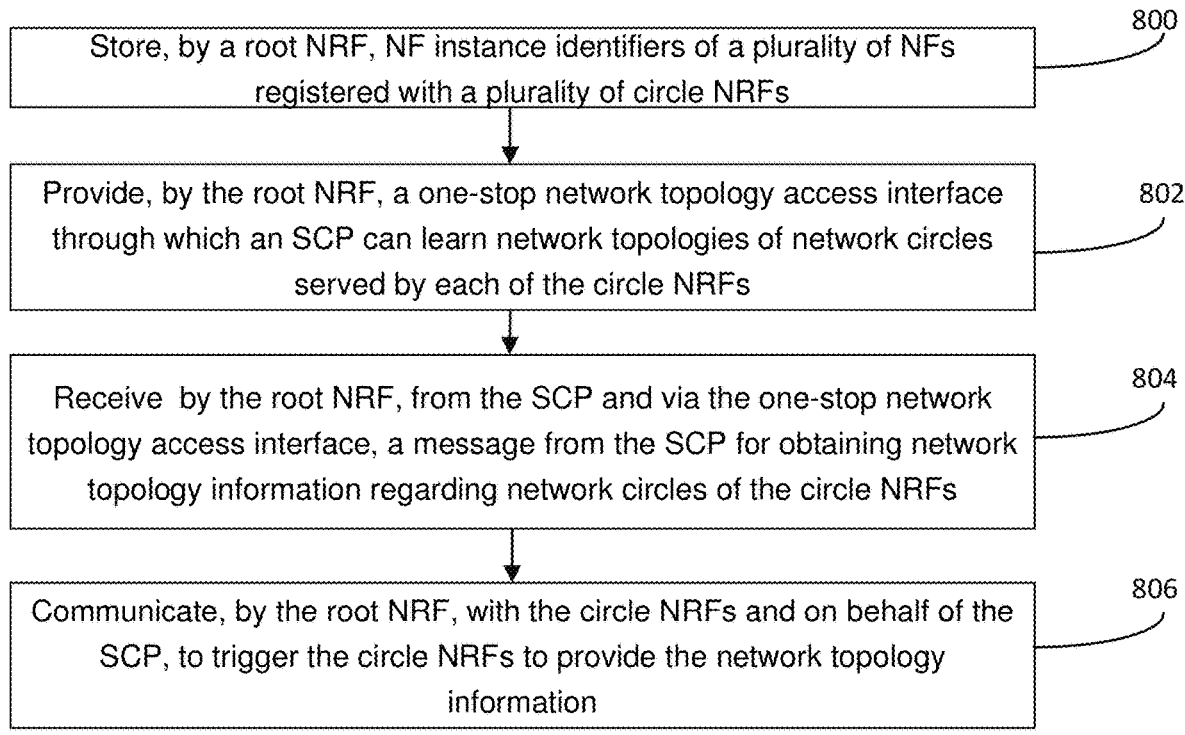
FIG. 8 is a flow chart illustrating an exemplary process performed by a root NRF for providing an interface through which a circle SCP can obtain network topology information.

FIG. 8 is a flow chart illustrating an exemplary process performed by a root NRF for providing an interface through which a circle SCP can obtain network topology information. Referring to FIG. 8, in step 800, the process includes storing, by a root NRF, NF instance identifiers of a plurality of NFs registered with a plurality of circle NRFs. For example, an NRF, such as root NRF 100R, may receive NF register requests from circle NRFs. The NF register requests may include NrfInfo attributes. The NrfInfo attributes may include NF instance IDs of the producer NFs registered with the circle NRFs. Root NRF 100R may read the NF instance IDs of the NFs registered with the circle NRFs from the NrfInfo attributes and may store the NF instance IDs in the NF profiles/network topology database.

In step 802, the process includes providing, by the root NRF, a one-stop network topology access interface through which an SCP can learn network topologies of network circles served by each of the circle NRFs. For example, an NRF, such as root NRF 100R, may include a one-stop network topology access manager that provides an NF status subscribe interface for receiving NF status subscribe messages, an NF list retrieval interface for receiving NF list retrieval request messages, and an NF profile retrieval interface for receiving NF profile retrieval request messages from a circle SCP.

In step 804, the process includes receiving, by the root NRF, from the SCP and via the one-stop network topology access interface, a message for obtaining network topology information regarding network circles of the circle NRFs. For example, an NRF, such as root NRF 100R, may receive an NF status subscribe message, an NF list retrieval message, or an NF profile retrieval message from a circle SCP.

In step 806, the process further includes communicating, by the root NRF, with the circle NRFs and on behalf of the SCP, to trigger the circle NRFs to provide the network topology information. For example, if the message is an NF status subscribe message, an NRF, such as root NRF 100R, may receive the NF status subscribe message and transmit, on behalf of the circle SCP, NF status subscribe messages to some or all of the circle NRFs. Root NRF 100R may include, in the NF status subscribe message, a notification URI of the circle SCP, which triggers the circle NRFs to send NF status notification messages directly to the circle SCP, bypassing the root NRF.

If the message is an NF list retrieval request, root NRF 100R may generate and transmit an NF list retrieval response to the circle SCP. Root NRF 100R may include, in the NF list retrieval response, NF instance IDs of the producer NFs registered with the circle NRFs that match any criteria (such as NF type) specified in the NF list retrieval request. Root NRF 100R may append its URI to the NF instance IDs returned in the NF list retrieval response so that the circle SCP will send NF profile retrieval requests for those NF instance IDs to root NRF 100R.

If the message is an NF profile retrieval request, root NRF 100R may receive the request, halt or suspend the normal process of generating and sending an NF profile retrieval response, and send NF profile retrieval requests to some or all of the circle NRFs, depending on any criteria, such as NF instance IDs or NF types, specified in the NF profile retrieval request from the circle SCP. The circle NRFs will each respond to the NF profile retrieval request with an NF profile retrieval response including NF profiles of producer NFs registered with each circle NRF. Root NRF 100R receives the NF profile retrieval responses, resumes processing of the NF profile retrieval request by generating an NF profile retrieval response, and includes, in the NF profile retrieval response, the NF profiles of producer NFs received in the NF profile retrieval responses from the circle NRFs. Root NRF 100R transmits the NF profile retrieval response to the circle SCP.

Figure 9:
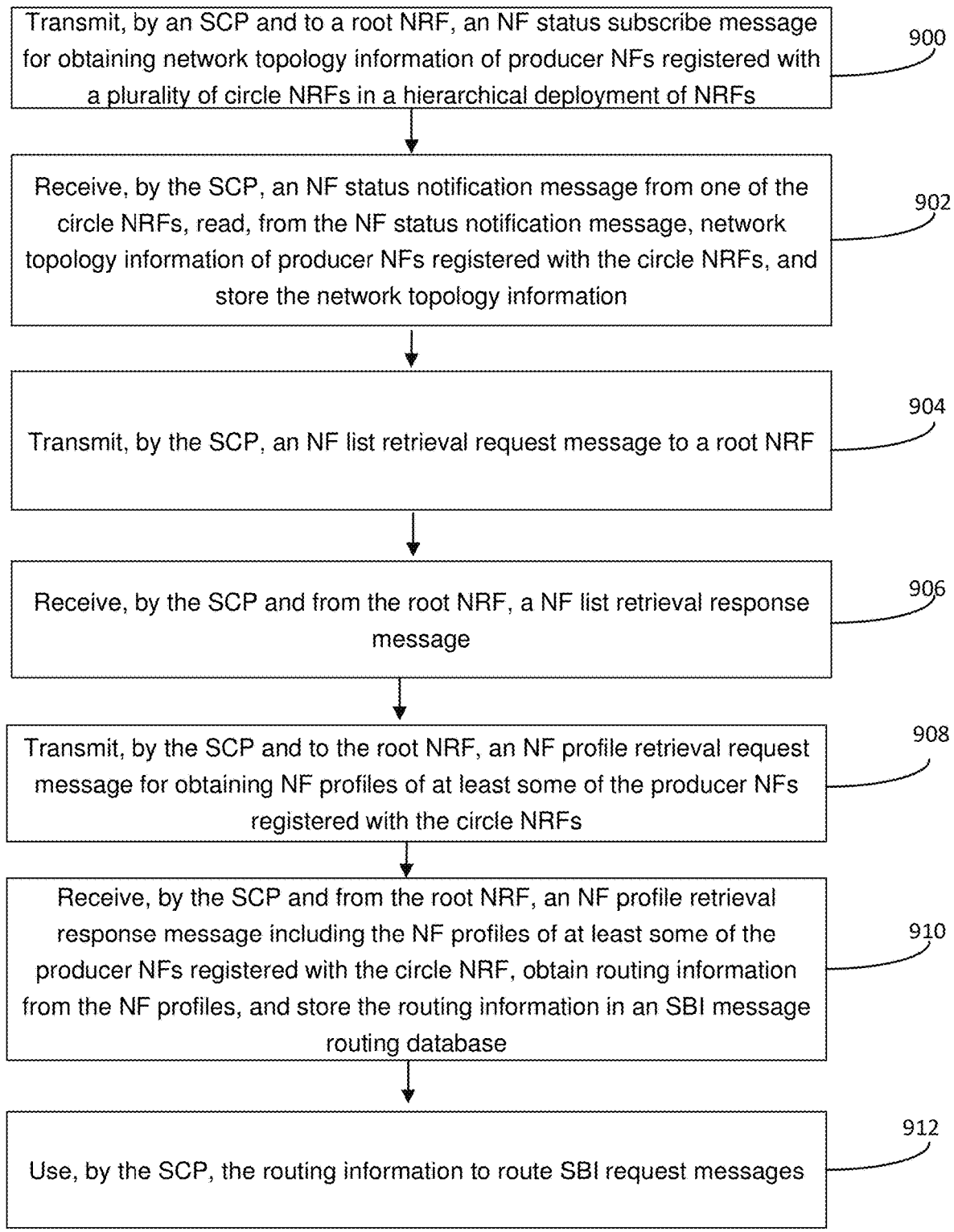
FIG. 9 is a flow chart illustrating an exemplary process performed by a circle SCP for obtaining network topology information using an interface provided by a root NRF.

FIG. 9 is a flow chart illustrating an exemplary process performed by a circle SCP for obtaining network topology information using an interface provided by a root NRF. Referring to FIG. 9, in step 900, the process includes transmitting, by an SCP and to a root NRF, an NF status subscribe message for obtaining network topology information of producer NFs registered with a plurality of circle NRFs in a hierarchical deployment of NRFs. For example, an SCP, such as circle SCP $101_{C1}$, may transmit an NF status subscribe message to root NRF 100R and identify the NF instance IDs of circle NRFs from which the operator of the circle SCP desires to receive network topology information.

In step 902, the process includes receiving, by the SCP, an NF status notification from one of the circle NRFs, reading, from the NF status notification message, network topology information of producer NFs registered with the circle NRF, and storing the network topology information. For example, a circle SCP, such as circle SCP $101_{C1}$, may receive and store NF profiles of producer NFs received in NF status notification messages from the circle NRFs.

In step 904, the process includes transmitting, by the SCP, an NF list retrieval request to a root NRF. For example, an SCP, such as circle SCP $101_{C1}$, may transmit an NF list retrieval request message to root NRF 100R requesting a list of some or all of the NF instance identifiers of producer NFs registered with circle NRFs. For example, an SCP, such as circle SCP $101_{C1}$, may transmit a list retrieval request to root NRF 100R to retrieve a list of all or a subset of the NF instance IDs of producer NFs registered with the circle NRFs.

In step 906, the process includes receiving, by the SCP and from the root NRF, an NF list retrieval response message. For example, an SCP, such as circle SCP $101_{C1}$, may receive, from root NRF 100R, an NF list retrieval response message including a list of some or all of the NF instance identifiers of producer NFs registered with the circle NRFs.

In step 908, the process includes transmitting, by the SCP and to the root NRF, an NF profile retrieval request message for obtaining NF profiles of at least some of the producer NFs registered with the circle NRFs. For example, an SCP, such as circle SCP $101_{C1}$, may transmit an NF profile retrieval request message to root NRF 100R and specify in the request, the NF instance IDs and/or NF types of producer NFs for which the operator of SCP $101_{C1}$ desires to obtain NF profile information.

In step 910, the process includes, receiving, by the SCP and from the root NRF, an NF profile retrieval response message including the NF profiles of at least some of the producer NFs registered with the circle NRFs, obtaining routing information from the NF profiles, and storing the routing information in an SBI message routing database. For example, an SCP, such as circle SCP $101_{C1}$, may read and store NF instance ID information, NF type information, NF capacity information, etc., from the NF profiles and store this information in an SBI routing information database.

In step 912, the process includes using, by the SCP, the routing information to route SBI request messages. For example, an SCP, such as circle SCP $101_{C1}$, may receive SBI request messages and use the routing information in the SBI routing information database to select producer NFs in other network circles to which the SBI request messages should be forwarded or routed.

Exemplary advantages of the subject matter described herein include reducing the need for circle SCPs to communicate with all of the circle or regional NRFs to retrieve NF registration details. This significantly reduces the latency of syncing between SCPs and NRFs located in geographically separate regions. The utilization of CPU cycles in the SCP and NRF to sync the network topology is also reduced. The need for complex connectivity management between SCPs and the circle NRFs is also reduced.

The disclosure of each of the following references is hereby incorporated herein by reference in its entirety.

REFERENCES 1. 3$^{rd}$ Generation Partnership Project; Technical Specification Group Core Network and Terminals; 5G System; Network Function Repository Services; Stage 3 (Release 18) 3GPP TS 29.510 V18.6.0 (2024-03)
2. 3$^{rd}$ Generation Partnership Project; Technical Specification Group Services and System Aspects; System Architecture for the 5G System (5GS); Stage 2 (Release 18) 3GPP TS 23.501 V18.5.0 (2024-03)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing for service communication proxies (SCPs) to learn network topology using a root network function (NF) repository function (NRF), the method comprising:
    storing, by a root NRF, NF instance identifiers of a plurality of NFs registered with a plurality of circle NRFs;
    providing, by the root NRF, a one-stop network topology access interface through which a service communication proxy (SCP) can learn network topologies of network circles served by each of the circle NRFs;
    receiving, by the root NRF, from the SCP and via the one-stop network topology access interface, a message for obtaining network topology information from the circle NRFs; and
    communicating, by the root NRF, with the circle NRFs and on behalf of the SCP, to trigger the circle NRFs to provide the network topology information.

2. The method of claim 1 comprising, at the root NRF, receiving NF register requests from the circle NRFs including NrfInfo attributes and wherein storing the NF instance identifiers includes storing NF instance identifiers obtained from the NrfInfo attributes.

3. The method of claim 1 wherein providing the one-stop network topology access interface includes providing an NF status subscribe interface through which the SCP can subscribe to receive network topology information regarding the NFs registered with the circle NRFs.

4. The method of claim 3 wherein receiving a message from the SCP includes receiving an NF status subscribe message from the SCP for subscribing to receive network topology information from the circle NRFs and communicating with the circle NRFs to trigger the circle NRFs to provide the network topology information includes transmitting an NF status subscribe message from the root NRF to each of the circle NRFs.

5. The method of claim 4 comprising structuring, by the root NRF, the NF status subscribe message transmitted to each of the circle NRFs to trigger each of the circle NRFs to send the network topology information directly to the SCP.

6. The method of claim 5 wherein structuring the NF status subscribe message transmitted to each of the circle NRFs to trigger the circle NRFs to send the network topology information directly to the SCP comprises inserting a notification uniform resource indicator (URI) of the SCP in the NF status subscribe message.

7. The method of claim 1 wherein providing the one-stop network topology access interface includes providing an NF list retrieval interface through which the SCP can obtain, from the root NRF, a list of NF instance IDs of NFs registered with the circle NRFs.

8. The method of claim 7 wherein receiving a message from the SCP includes receiving an NF list retrieval request message from the SCP and further comprising generating and transmitting, to the SCP, an NF list retrieval response message including a list of NF instance IDs requested by the NF list retrieval request message and a resource uniform resource indicator (URI) of the root NRF.

9. The method of claim 8 wherein providing the one-stop network topology access interface includes providing an NF profile retrieval interface through which the SCP can obtain, from the root NRF, NF profiles of NFs registered with the circle NRFs.

10. The method of claim 9 wherein receiving a message from the SCP includes receiving an NF profile retrieval request message from the SCP and communicating with the circle NRFs includes transmitting NF profile retrieval request messages to the circle NRFs, receiving NF profile retrieval response messages from the circle NRFs and further comprising, transmitting, by the root NRF and to the SCP, an NF profile retrieval response message including network topology information obtained from the NF profile retrieval response messages received from the circle NRFs.

11. A system for providing for service communication proxies (SCPs) to learn network topology using a root network function (NF) repository function (NRF), the system comprising:
    a root NRF including at least one processor and a memory;
    an NF profiles/network topology database embodied in the memory for storing NF instance identifiers of a plurality of NFs registered with a plurality of circle NRFs; and
    a one-stop network topology access manager implemented by the at least one processor for providing a one-stop network topology access interface through which an SCP can learn network topologies of network circles served by each of the circle NRFs, receiving, from the SCP and via the one-stop network topology access interface, a message for obtaining network topology information regarding network circles of the circle NRFs, and communicating, with the circle NRFs and on behalf of the SCP, to trigger the circle NRFs to provide the network topology information.

12. The system of claim 11 wherein the one-stop network topology access manager is configured to provide, as part of the one-stop network topology access interface, an NF status subscribe interface through which the SCP can subscribe to receive network topology information regarding the NFs registered with the circle NRFs.

13. The system of claim 12 wherein the message received from the SCP includes an NF status subscribe message from the SCP for subscribing to receive network topology information from the circle NRFs and wherein the one-stop network topology access manager is configured to communicate with the circle NRFs to trigger the circle NRFs to provide the network topology information by transmitting an NF status subscribe message from the root NRF to each of the circle NRFs.

14. The system of claim 13 wherein the one-stop network topology access manager is configured to structure the NF status subscribe message transmitted to each of the circle NRFs to trigger each of the circle NRFs to send the network topology information directly to the SCP.

15. The system of claim 14 wherein, in structuring the NF status subscribe message transmitted to each of the circle NRFs to trigger the circle NRFs to send the network topology information directly to the SCP, the one-stop network topology access manager is configured to insert a notification uniform resource indicator (URI) of the SCP in the NF status subscribe message.

16. The system of claim 11 wherein the one-stop network topology access manager is configured to provide, as part of the one-stop network topology access interface, an NF list retrieval interface through which the SCP can obtain, from the root NRF, a list of NF instance IDs of NFs registered with the circle NRFs.

17. The system of claim 16 wherein the message from the SCP includes an NF list retrieval request message from the SCP and wherein the one-stop network topology access manager is configured to generate and transmit, to the SCP, an NF list retrieval response message including a list of NF instance IDs requested by the NF list retrieval request message and a resource uniform resource indicator (URI) of the root NRF.

18. The system of claim 17 wherein the one-stop network topology access manager is configured to provide, as part of the one-stop network topology access interface, an NF profile retrieval interface through which the SCP can obtain, from the root NRF, NF profiles of NFs registered with the circle NRFs.

19. The system of claim 18 wherein the message from the SCP includes an NF profile retrieval request message from the SCP and wherein the one-stop network topology access manager is configured to communicate with the circle NRFs by transmitting NF profile retrieval request messages to the circle NRFs, receiving NF profile retrieval response messages from the circle NRFs, and transmitting, to the SCP, an NF profile retrieval response message including network topology information obtained from the NF profile retrieval response messages received from the circle NRFs.

20. A non-transitory computer readable medium having stored thereon executable instructions that when executed by a processor of a computer control the computer to perform steps comprising:
    storing, by a root network function (NF) repository function (NRF), NF instance identifiers of a plurality of NFs registered with a plurality of circle NRFs;
    providing, by the root NRF, a one-stop network topology access interface through which a service communication proxy (SCP) can learn network topologies of network circles served by each of the circle NRFs;
    receiving, by the root NRF, from the SCP and via the one-stop network topology access interface, a message for obtaining network topology information regarding network circles of the circle NRFs; and
    communicating, by the root NRF, with the circle NRFs and on behalf of the SCP, to trigger the circle NRFs to provide the network topology information.

* * * * *